United States Patent [19]

Scholten et al.

[11] Patent Number: 4,510,612
[45] Date of Patent: Apr. 9, 1985

[54] SYSTEM COMPRISING MUTUALLY SYNCHRONIZING FIRST AND SECOND ACTIVE FUNCTIONAL UNITS

[75] Inventors: Carel S. Scholten; Arie Slob; Pierre G. Jansen, all of Eindhoven, Netherlands

[73] Assignee: U.S. Philips Corporation, New York, N.Y.

[21] Appl. No.: 358,752

[22] Filed: Mar. 16, 1982

[30] Foreign Application Priority Data

Apr. 3, 1981 [NL] Netherlands ......................... 8101666

[51] Int. Cl.³ .............................................. H04L 7/02
[52] U.S. Cl. .................................... 375/106; 307/527; 328/63
[58] Field of Search .............. 375/106, 107, 109, 110, 375/116, 20; 307/510, 262, 269, 527; 328/63, 74, 155, 179; 370/103

[56] References Cited

U.S. PATENT DOCUMENTS

4,128,201 12/1978 Barron et al. ................... 375/106 X

Primary Examiner—Robert L. Griffin
Assistant Examiner—Stephen Chin
Attorney, Agent, or Firm—Jack E. Haken; James J. Cannon, Jr.

[57] ABSTRACT

A synchronization system for two active functional units which are interconnected by means of a synchronization connection. In order to obtain reliable synchronization without using an untoward number of wires in the connection, at least one of the two functional units has a generator which is capable of generating three successive discrete signal levels on a single connection wire of the synchronization connection. This function unit also has a detector for detecting a signal transition which is produced by a generator in the other active functional unit and for generating an activation signal in reaction thereto. In response to this activation signal, the generator of the same functional unit produces a succession of two signal transitions from one prevailing extreme signal level to the other extreme signal level of the three successive signal levels. The other functional unit has a detector which produces, in response to the second signal transition of the succession, an activation signal for the generator of the other functional unit in order to produce a synchronized signal transition or transitions. Such successions of signal transitions can be transmitted in one or both directions; the synchronization connection may even consist of a single connection wire on which a total of five different signal levels may then occur.

6 Claims, 14 Drawing Figures

SYSTEM COMPRISING MUTUALLY SYNCHRONIZING FIRST AND SECOND ACTIVE FUNCTIONAL UNITS

BACKGROUND OF THE INVENTION

Field of the Invention

The invention relates to a system comprising first and second active functional units which are coupled together by means of a synchronization connection in order to supply synchronization signal transitions in handshake from the first to the second functional unit as well as from the second to the first functional unit, each said functional unit having generator circuits for forming signal transitions on the synchronization connection and detector circuits for detecting signal transitions formed on the synchronization connection by the generator circuits of the other functional unit, each said generator circuits being controlled by the detector circuits of the same functional unit so as to respond to signal transitions formed on the synchronization connection by the generator circuits in the other functional unit. A system of this kind is known from U.S. Pat. No. 4,357,658 which is incorporated herein by reference. Notably a two-wire handshake and the interaction thereof with unidirectional and bidirectional data transport is described therein. The handshake utilizes bivalent request and acknowledge signals, each signal transition by the first active functional unit enabling a subsequent signal transition in the second functional unit and vice versa. This handshake will be described in detail hereinafter. The synchronization obtained is satisfactory in many cases when adequate restrictions are imposed as regards the properties of the active functional units to be used. However, the definition of the signal transitions may be insufficient; they may for example be subject to so-called jitter: during a given interval, a sequence of transitions then occurs to and fro between the old and the new signal level. Because the handshake in the known system does not have redundance, errors can occur during jitter: during jitter a signal transition may unduly act as a "real" synchronizing signal transition for the other active functional unit. If the other active functional unit reacts comparatively quickly thereto, such a premature reaction may cause an error in the synchronization. In order to avoid these problems, the response of the receiving functional unit or station can be delayed; the amount of the delay must then be determined by the worst case liable to occur in the other station. When use is made of functional units having clock frequencies which differ substantially from one another, the delay may be large and even then the protection will not be absolute; for example if the critical clock frequency becomes still lower. Alternatively the transmitting station may generate a signal transition having a very flat edge. The receiving station must not react thereto before the transmitting station were to expect to receive the next signal transition; this can take place only if it has eventually detected its own signal transition. In such circumstances a waiting time which is chosen to allow for the worst case must again be incorporated in the receiving station.

The situation can be improved by increasing the number of connection wires used for the synchronization to four (two in both directions). After detection of a received signal transition, each of the active functional units itself then generates a signal transition, that is to say alternately on the one and on the other outgoing synchronization wire. On the one hand, the restrictions as regards the waiting times to be implemented (no longer necessary) or the permissible clock frequencies are thus cancelled. On the other hand, the larger number of connection wires has a severe cost-increasing effect.

SUMMARY OF THE INVENTION

It is an object of the invention to provide a system in which the number of connection wires in the synchronization connection between the active functional units can be small but in which the use of more than two signal levels on at least one connection wire of the synchronization connection makes it possible for the waiting period in at least one active functional unit after the detection of a signal transition to be no longer than that determined by the properties of the detecting active functional unit itself. The invention provides a system having first and second active functional units which are coupled together by means of a synchronization connection in order to supply synchronization signal transitions in handshake from the first to the second functional unit as well as from the second to the first functional unit, each said functional unit comprising generator means for forming signal transitions on the synchronization connection and detector means for detecting signal transitions formed on the synchronization connection by the generator means of the other functional unit, each said generator means being controlled by the detector means of the same functional unit so as to respond to signal transitions formed on the synchronization connection by the generator means in the other functional unit, characterized in that the generator means in said first active functional unit is arranged to apply three successive levels to a single connection wire of said synchronization connection and to generate, each time it responds to a signal transition formed on said synchronization connection by the generator means in said second active functional unit, a succession of two signal transitions from one extreme signal level to the other extreme signal level of said three successive signal levels, the detector means in said second active functional unit having said single connection wire coupled thereto and being such that the generator means in said second active functional unit responds only to the second signal transition of each succession. Each time a said succession is generated it should be ensured that the second signal transition thereof can commence only after the first signal transition thereof has been completed. Provided this is so then, upon detection of the second signal transition of a succession, the other active functional unit need not wait any longer, because the first signal transition of said succession has already become irrevocable.

Preferably, the generator means in said second active functional unit is arranged to apply three successive levels to a single connection wire of said synchronization correction and to generate, each time it responds to a signal transition formed on said synchronization connection by the generator means in said first active functional unit, a succession of two signal transitions from one extreme signal level to the other extreme signal level of these three successive signal levels, the detector means in said first active functional unit having this single connection wire coupled thereto and being such that the generator means in said first active functional unit responds only to the second signal transition of each said succession. This allows the advantages to be applicable to the detection in both active functional units. Moreover, it allows the number of conductors required for the synchronization connection to be no more than two.

Said synchronization connection may comprise a single conductor comprising means for continuously forming a sum level of the signal levels applied to said single conductor by both said generator means, said sum level having a value range which includes at least five discrete values. This allows the advantages to be maintained, but the number of connection wires of the synchronization connection to be reduced further.

BRIEF DESCRIPTION OF THE DRAWINGS

Embodiments of the invention will be described in detail hereinafter, by way of example, with reference to the accompanying diagrammatic drawings, in which.

DESCRIPTION OF THE PREFERRED EMBODIMENTS

Description of the Prior Art

Figure 1A:
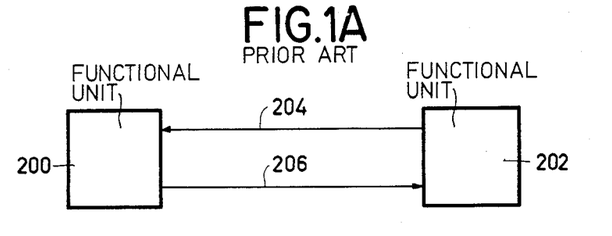
FIGS. 1A and 1B show a known synchronization system and a time diagram of the synchronization signals occurring therein.
Figure 1B:
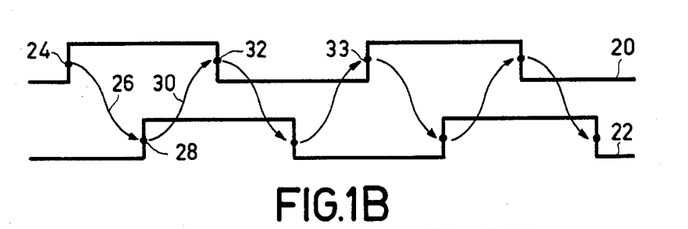

FIG. 1 shows a known synchronization system, together with a time diagram of the synchronization signals occurring therein. Two active functional units 200, 202 are interconnected by means of two unidirectional connecting wires 204, 206 which together constitute a synchronization connection. Other connections, for example for data transport and further control, have been omitted. The active fundamental units may be constructed, for example, as microcomputers of the type INTEL 8048, as mini computers, or otherwise. Also present may be non-active functional units, for example memories and slave processors, but these units are not considered herein. On line 20 the Figure shows the synchronization signals formed by the first active functional unit and on line 22 the synchronization signals formed by the second active functional unit. Apart from the realization of the handshake, the further operation of the system is irrelevant for the present description. The referenced Patent discloses how uni/bidirectional data transport is synchronized by these signals. The two active functional units may furthermore process data internally or may cooperate with other devices such as input/output equipment. It is alternatively possible for one of the two active functional units to act as an input/output apparatus for the other unit. The two active functional units are interconnected by means of two separate conductors, so that the curves 20 and 22 are the complete signals on respective one's of these conductors. When the first active functional unit generates a first signal transition (24), the transition is detected by the second active functional unit. As has already been stated, it may require some time before the detection is considered to be "valid". The detection in the second active functional unit produces an activation signal. Under the control thereof, the second active functional unit produces a signal transition (28). The causal connection is indicated by the arrow 26. After some time, the signal transition 28 is detected in the first active functional unit and controls a subsequent signal transition (32) therein. The causal connection is indicated by the arrow 30.

Figure 2A:
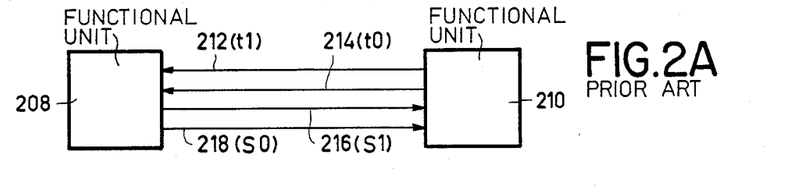
FIGS. 2A and 2B show a further known synchronization system comprising four connection wires, and a time diagram of the synchronization signals occurring therein.
Figure 2B:
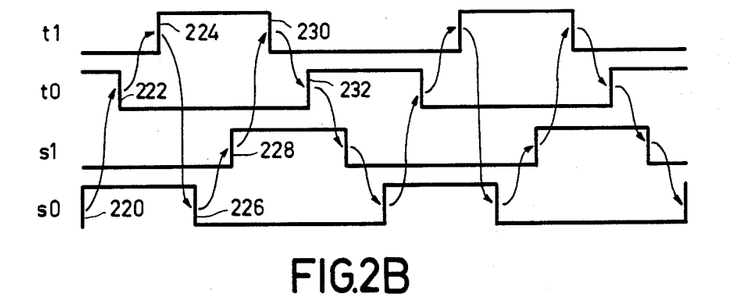

For the sake of completeness, FIG. 2 shows a further known synchronization system with four connection wires, and a time diagram of the synchronization signals occurring therein. There are two active functional units 208, 210. These units are interconnected by four unidirectional connection wires for synchronization signals, i.e. 212 (signal t1), 214 (signal t0), 216 (signal s1) and 218 (signal s0). The causal relationships are again indicated by a series of arrows in the time diagram. The signals in fact have an arbitrary polarity. When the signal s0 changes from low to high (220), the transition is detected in the functional unit 210. The latter then produces a signal transition in the signal t0 from high to low (222) and subsequently a signal transition in the signal t1 from low to high (224). This transition is detected in the functional unit 208. Subsequently, the latter unit produces a signal transition in the signal s0 from high to low (226) and subsequently a signal transition in the signal s1 from low to high (228). This transition is detected in the functional unit 210. In reaction thereto, the latter unit produces a signal transition in the signal t1 from high to low (230) and subsequently a signal transition in the signal t0 from low to high (232). This is detected in the functional unit 208. In reaction thereto, the latter functional unit produces a signal transition in the signal s1 from high to low and subsequently a signal transition in the signal s0 from low to high; this completes the description of a full cycle.

Description of a First Embodiment

Figure 3:
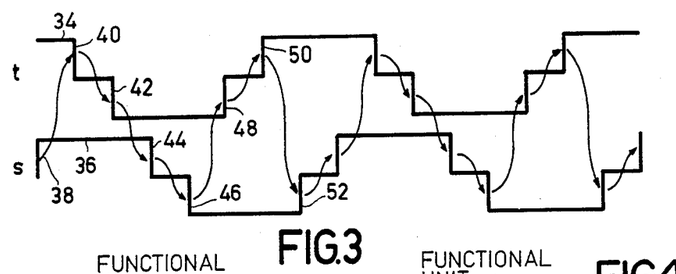
FIG. 3 is a time diagram of synchronization signals occurring in a first embodiment of the invention employing a two-wire synchronization system.

FIG. 3 a time diagram of synchronization signals occurring in a first embodiment of the invention employing a two-wire synchronization system. The external configuration of the active functional units is that shown in FIG. 1. The upper curve 34 in FIG. 3 represents the signal on line 204, the lower curve 36 representing the signal on line 206. Each active functional unit is connected to one of the two connection wires by mens of a generator which is capable of producing three discrete signal values. The other active functional unit is connected to the relevant signal wire by means of a detector which is capable of discriminating between the three discrete signal values; examples thereof will be described hereinafter. The precise values of the signals are not essential for the operation of the handshake.

Assume that at a given instant the active functional unit 200 produces a transition 38 on the line 206 from the middle signal level to the highest signal level. The causal relationship is again indicated by a series of arrows in the time diagram. The signal transition 38 is detected in the active functional unit 202. The latter then first produces a signal transition 40 from the highest level to the middle level on the line 204 and, once this signal transition has become definite, a signal transition 42 from the middle to the lowest signal level. The latter transition is detected in the functional unit 200. The functional unit 200 then produces a signal transition 44 from the highest signal level to the middle signal level and, once this signal transition has become definite, a further signal transition 46 from the middle signal level to the lowest signal level. The latter transition is detected in the functional unit 202 which then produces a signal transition 48 from the lowest to the middle level and, once this signal transition has become definite, a further signal transition (50) from the middle to the highest level. The latter transition is detected in the functional unit 200 and this unit produces a signal transition 52 from the lowest to the middle level; the starting situation has then been reached again. Each active functional unit produces a succession of two successive signal transitions which extend in total from one extreme signal level to the other extreme signl level of a series of three successive signal levels. The synchronization between two active functional units can thus be realized by means of only two connection wires, and no restrictions have to be imposed as regards the clock frequencies to be used, the edge steepnesses of the signals, etc. It is merely necessary that the first transition of each succession of two successive signal transitions (for example, the pairs 40/42, 44/46, 48/50) has become definite before the second one commences.

Description of Further Embodiments

Figure 4A:
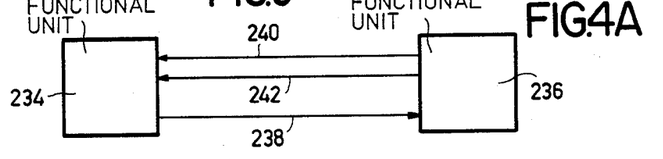
FIGS. 4A and 4B show a second embodiment of the invention in the form of a synchronization system with three connection wires, and a time diagram of the synchronization signals occurring therein.
Figures 4B, 5A:
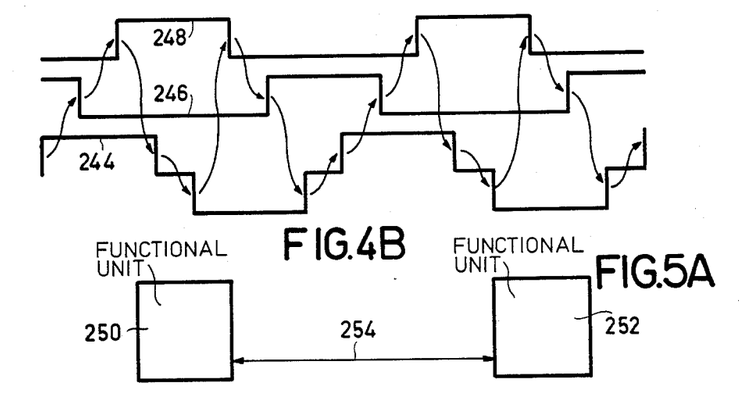
FIGS. 5A and 5B show a third embodiment of the invention in the form of a synchronization system comprising one connection wire, and a time diagram of synchronization signals occurring therein.

FIGS. 4A and 4B show a second embodiment of the invention in the form of a synchronization system comprising three connection wires, and a time diagram of the synchronization signals occurring therein. There are two active functional units 234, 236, one connection wire 238 from the functional unit 234, and two connection wires 240, 242 from the functional unit 236. The connection wire 238 carries the signal represented by the curve 244; this signal corresponds to the signal 36 in FIG. 3: a succession of two successive signal transitions in the same direction occurs each time. The connection wires 240, 242 carry the signals represented by the curves 246 and 248 respectively; these signals correspond to the signals t0 and t1, respectively, in FIG. 2. It should be noted that in the curve 244 the highest signal level and the lowest signal level may be interchanged, which corresponds to reversing the sequence in time; the direction of all causality arrows is then reversed. The same is applicable to the signals shown in FIG. 3. Furthermore, the polarity of the signal 246 and/or the signal 248 may be reversed. It should also be noted that the different time intervals are not necessarily drawn to scale; a scale different from that shown may be due, for example, to (substantially) different clock frequencies.

The formation of three signal levels on a single conductor can be realized in a simple manner by means of a so-called tri-state buffer. An example thereof is the component SN 74125 (Texas Instruments) which is suitable for driving four relevant lines. For each output conductor this module has two low impedance states (logic "1" and logic "0") and one high-impedance state which can be used, for example, as the intermediate state; in that case the potential of the relevant line when the buffer is in the high-impedance state can be determined by a fixed voltage divider (not shown in the Figure) between the high supply voltage and the low supply voltage. The output impedance of such a voltage divider should be low with respect to that of the said high impedance state, but high with respect to the low impedance states. Due to the large impedance difference between the low impedance states and the high impedance state, such an intermediate value can be readily realized.

Figure 5B:
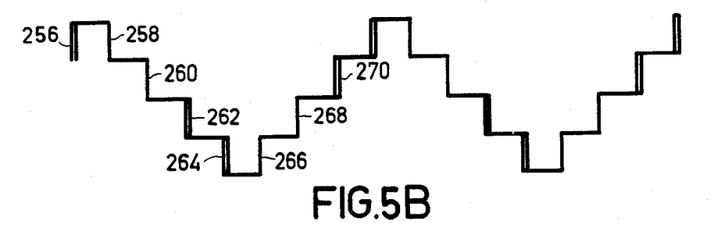

FIGS. 5A and 5B show a third embodiment of the invention in the form of a synchronization system comprising one connection wire, and also a time diagram of synchronization signals occurring therein. Two active functional units 250, 252 are provided and the synchronization connection comprises the single bidirectional connection wire 254. A generator for trivalent signals is connected to this connection wire in each functional unit. These generators each have a high output impedance, so that they act as current sources. The connection wire is connected to a fixed potential, for example ground potential, via a resistor (not shown) having a comparatively low resistance. The sum signal level on the conductor is thus formed as the sum of the two ternary signal levels s, t which are generated by the relevant functional units:

$$u = s + t$$

Obviously, it is alternatively possible to form another combination, for example:

$$u = s - t$$

A system for generating multivalent signals on a conductor as a sum of signals produced thereon by relevant generators is known from U.S. Pat. No. 3,993,867, reissued as Reissue No. 30111. This specification concerns binary signals supplied by active functional units of stations, the bidirectional conductor then carrying at least trivalent signals. In accordance with the system described, the active functional units generate trivalent signals and the bidirectional synchronization conductor then carries pentavalent signals (provided that all differences between two successive signal levels have the same values within given tolerances). Each functional unit is also connected to the conductor by means of a detector which is capable of discriminating between the five signal levels.

In the time diagram of FIG. 5B two kinds of signal transition are indicated: the signal transitions which are produced by the functional unit 250 are indicated by a single vertical line, while those which are generated by the active functional unit 252 are indicated by a double vertical line; the finite edge steepness and the like have been ignored. The succession of two transitions produced by one and the same functional unit with those produced by the other alternate. In this example, the absolute values of all signal transitions are assumed to be equal. Signal transition 256, for example, corresponds to the signal transition 38 in FIG. 3; signal transition 258 to signal transition 40; signal transition 260 to signal transition 42; and so on for the pairs of transitions 262/44, 264/46, 266/48, 268/50, 270/52.

Figure 6:
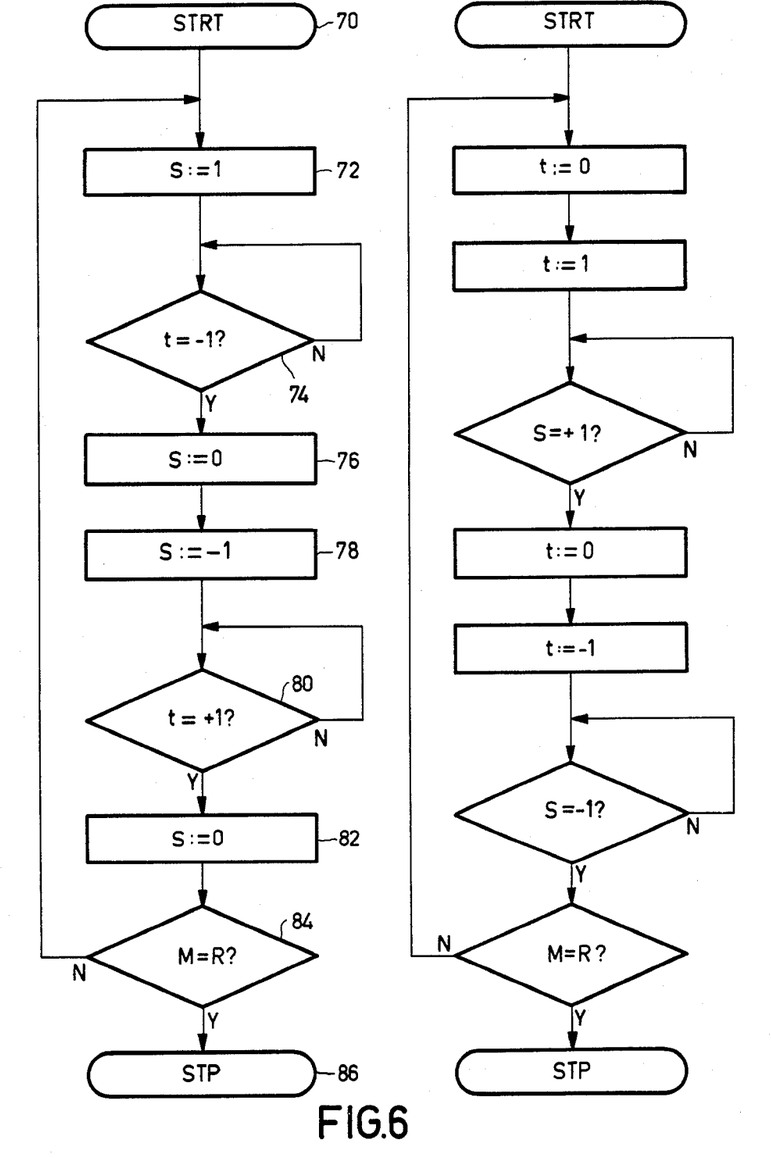
FIG. 6 is a flow chart of the operations occurring in the first embodiment.

FIG. 6 is a flow chart showing how the micro or mini computers included in the active functional units included in the embodiment described with reference to FIG. 3 are programmed in order that they should generate and respond to the synchronization signals in the required manner. The letter "s" indicates the signal level impressed on the first synchronization conductor by the first active functional unit, and the letter "t" indicates the signal level impressed on the second synchronization conductor by the second active functional unit. The left and right halves of FIG. 6 relate to the first and second units respectively. Block 70 indicates that a starting condition is formed by the first active functional unit. This can be done either once when the device is put into operation, or repeatedly, for example before each transmission of a message. In step 72 the outgoing signal level is made $+1$. In step 74 it is detected whether the signal level "t" has the value $-1$. If not, the first active functional unit enters a waiting loop in which the interrogation operation is continuously repeated. If $t=-1$, the first active functional unit proceeds to step 76 and makes the outgoing signal value 0. Subsequently, the value of s is made $-1$ in step 78. Subsequently, in step 80 it is detected whether the incoming signal has the value "1". If not, the active functional unit again enters a waiting loop. When the value "$t=+1$" is detected, the first active functional unit proceeds to step 82 and makes the outgoing signal value 0. Subsequently, the first active functional unit proceeds to step 84 and detects internally whether it is still necessary to maintain the synchronization. If not (Message=-Ready), the first active functional unit proceeds to state 86 "stop". If the synchronization is to be maintained indefinitely, the first active functional unit returns to step 72 (stage 86 and implicitly step 84, do not then exist). This return also takes place if the answer to the question Message=Ready was found to be negative in step 84. Thus, step 72 corresponds to the transition 38 in FIG. 3, step 76 to the transition 44, step 78 to the transition 46 and step 82 to the transition 52. The steps 70, 84, 86 have been omitted in FIG. 3. The right half of FIG. 6 similarly shows the situation for the second active functional unit.

Figure 7:
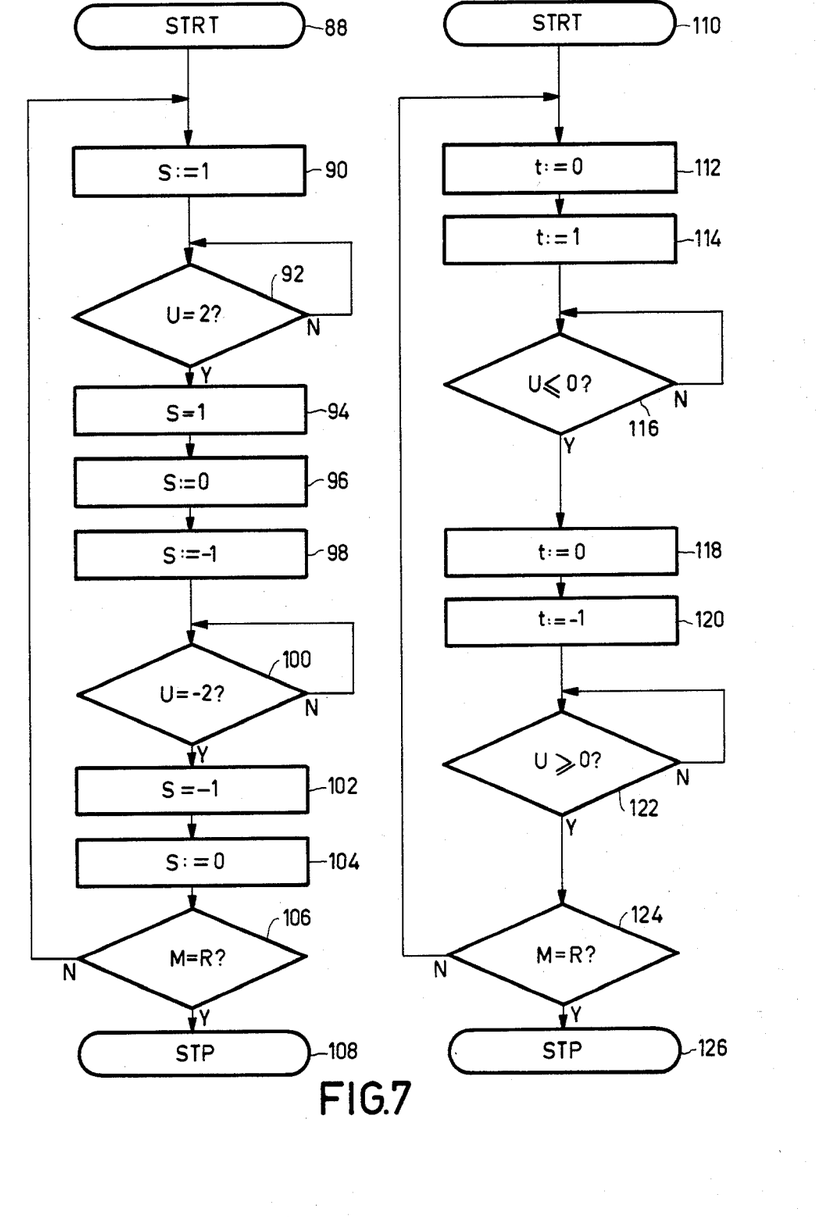
FIG. 7 is a flow chart of the operations occurring in the third embodiment.

FIG. 7 is a flow chart showing how the micro or mini computers included in the active functional units 250 and 252 of FIG. 5 are programmed in order that they should generate and respond to the synchronization signals in the required manner. The five possible values for u are indicated as $-2$, $-1$, 0, 1, 2 successively. The left half of the Figure again relates to the first active functional unit. In block 88, the start takes place. In step 90 the value of the signal s is made 1. In step 92 it is detected whether the other active functional unit supplies a signal $t=1$; because $s=1$ it follows that "u" must have the value "2". If this is not the case (N), the question is repeated, possibly after a short waiting period. Otherwise (Y), the condition $s=1$ is maintained in step 94 until the decision taken in step 92 has become irrevocable. Subsequently, the signal s is made 0 in step 96. If step 94 were to be omitted, it would in principle be possible for the functional unit to produce an inadequately defined transition between the steps 92 and 96: the detector could still wait for the signal condition $u=2$, while the generator would already have formed the signal $s=0$. This self-blocking effect is avoided by the insertion of the step 94. The steps 96, 98 produce a succession of two signal transitions from the one extreme level $(+1)$ to the other extreme level $(-1)$. Subsequently, in step 100 it is detected whether the second active functional unit also supplies a signal "$-1$", in other words whether the sum signal has the value $u=-2$. If the answer is yes (Y), the next step will be 102 in which the signal state $s=-1$ is maintained until the decision that the signal state u is $-2$ has become irrevocable. The step 102 thus also forms a protection against self-blocking occurring. In step 104 a signal transition is then produced (the first one of a new succession of two signal transitions) from the level $-1$ to the signal level 0. The step 104 corresponds to the step 82 in FIG. 6. The step 106 corresponds to the step 84 in FIG. 6. The step 108 corresponds to the step 86 in FIG. 6. The right half of FIG. 7 concerns the second active functional unit. The steps 110, 112, 114, 118, 120, 124, 126 each correspond to a step in the right half of FIG. 6. In step 116 it is detected whether the sum signal on the synchronization conductor has a value $u \leq 0$. Actually, in nominal circumstances it would be sufficient to detect the condition $u=0$, because the actual condition required is $s=-1$. However, the condition $u \leq 0$ is detected because this allows the signal t to be subsequently made 0, without this condition ceasing to be satisfied, thereby avoiding possible self-blocking. Reaching step 118 thus implies that the step 98 has been reached in the other active unit; the value $s=-1$ is maintained up to and including the step 102. However, the step 102 can be reached only after the completion of step 116, so that the question $u \leq 0$? can only hold good while the steps 98 and 100 are being carried out. Similarly, in step 122 the question "$u \geq 0$?" implies the same as "$s=1$?", and this question can only hold good during the completion of the steps 90 and 92. Again no additional step with "$t=-1$" is required after step 124 to guard against the self-blocking effect. The right half of FIG. 7 includes four states in which a signal is supplied: 112, 114, 118, 120; these states can be formed by decoding the state of a suitable clocked combination of two bistable elements. The left half of FIG. 7 includes six of such states: 90, 94, 96, 98, 102, 104. These six states, therefore, can be formed by decoding the state of a suitably clocked combination of at least three bistable elements.

Figure 8:
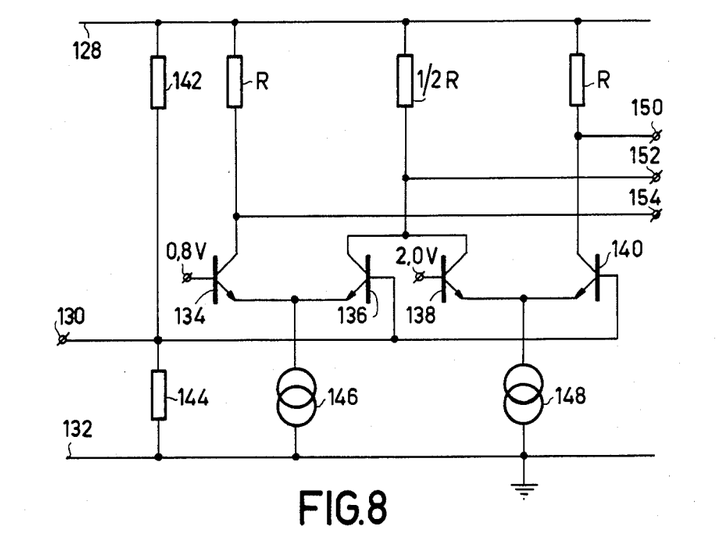
FIG. 8 shows a first receiver for trivalent signals, which receiver may be used in the first and second embodiments.
Figure 9:
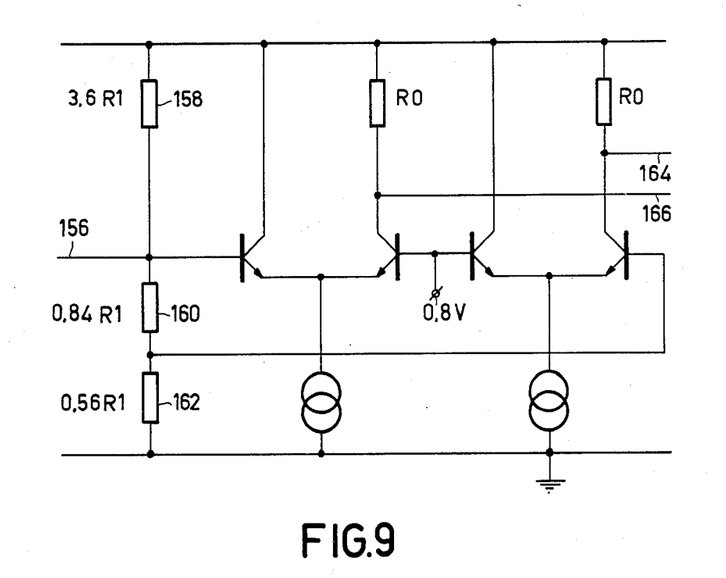
FIG. 9 shows a second receiver for trivalent signals, which receiver may be used in the first and second embodiments.
Figure 10:
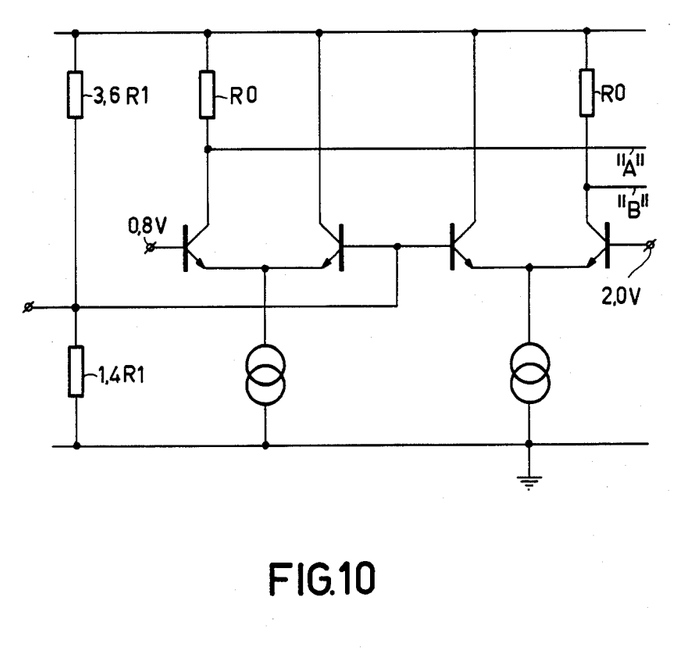
FIG. 10 shows a third receiver for trivalent signals which receiver may be used in the first and second embodiments.

FIGS. 8, 9 and 10 show three receiver circuits which are capable of discriminating between three different levels of the input signals, which receivers may be included in the active units forming part of the embodiment described with reference to FIG. 3 and in the active unit 236 of FIG. 4. Line 128 in FIG. 8 is connected to a potential of $+5$ volts, line 132 being connected to ground. The input signal appears on line 130. This trivalent receiver is capable of recognizing three signal levels, because if the transmitter in the other active unit has a tristate output, the receiver itself adjusts the voltage level when the transmitter has a high output impedance. The base of transistor 134 carries a voltage of 0.8 volts and the base of transistor 138 carries a voltage of $+2.0$ volts. The resistors 142, 144 form a voltage divider in order to define the high impedance level. They may in principle alternatively be connected to the synchronization conductor at another location, for example in the transmitter. Elements 146, 148 are conventional current sources. If the voltage received (terminal 130) exceeds $+2.0$ volts with low impedance termination of the line, a low voltage is supplied to terminal 150. If the voltage received is below 0.8 volts with low impedance termination of the line, a low voltage is supplied to terminal 154. If the transmitter has a high output impedance, the resistors 142, 144 generate a voltage of 1.4 volts on the terminal 130 and a low voltage is supplied to terminal 152. The three output terminals 150, 152, 154 can be used for driving, if necessary after voltage transformation, further transistors connected according to the customary TTL technique. It will be evident from the foregoing that the three outputs 150, 152, 154 exhibit redundancy and that one (an arbitrary one) thereof may be omitted.

FIG. 9 shows a solution requiring only a single reference voltage. The supply voltages are again 5 V and 0 V, respectively, and the input signal appears on terminal 156. Resistors 158, 160, 162 form the voltage on the input if the transmitter has a high output impedance. Using the voltage divider, moreover, a change-over level of 2 V is realized by means of a single reference voltage as indicated. The resistors Ro have a value which is customary for collector resistances. If the input signal is high, output terminal 164 becomes low. If the input voltage is low, output terminal 166 becomes low. If the input has a high impedance, both output terminals become low. A known level converter can again be advantageously used. It will be clear that the resistors 158, 160, 162 in this case form part of the receiver and not of the line (because they are connected to the remainder of the circuit via two branches). The current sources shown may in given cases be replaced by suitable resistors.

The solution shown in FIG. 10 requires only four resistors. The output lines can assume the values H (high voltage level) and L (low voltage level). The following table shows the output voltages formed:

| transmitter | A | B |
| --- | --- | --- |
| low | L | L |
| high impedance | H | L |
| high | H | H |

In a synchronization system comprising only a single synchronization conductor, each active functional unit may comprise a current generator which is capable of generating three different values, similarly to the corresponding generators provided in the two stations described in the referenced U.S. Pat. No. Re. 30111. The receiver circuits must then also be capable of detecting five different discrete signal values. This can be readily realized by extending the circuit of FIG. 8. Each pair of transistors 134/136 and 138/140 (so-called long-tailed pairs) implements one decision: "higher than" or "lower than" a limit level. Five signal values can thus be detected by means of four of such pairs of transistors. Again savings can then be achieved in the manner shown in the FIGS. 9 and 10.

Notably in the set-ups according to FIGS. 3, 4 more than two stations may take place in the synchronizing handshake, one thereof operating as a master, while the others function as slaves. The number of lines controlled by the slaves would be twice the number shown in FIGS. 3, 4: each of those lines operates in a way that for only two logical levels is called "wired AND" or "wired OR". This means that the voltage level is determined by the highest, or alternatively by the lowest voltage level applied thereto by any one connected station. The master station would only react on the signal transition produced by the slowest-operating slave station.

What is claimed is:

1. A synchronization system comprising a first station having a first clock generator, a first signal generator and a first detector; a second station having a second clock generator, a second signal generator and a second detector, said first generator and said second detector being interconnected by a single first interconnecting wire; said second signal generator and said first detector being interconnected by a single second interconnecting wire;

wherein said first signal generator has means for producing under stepwise control by said first clock generator a first stepwise succession of three discrete signal values on said first interconnecting wire from a first extreme signal value to a second extreme signal value and vice versa, two successive discrete signal values being separated by an associated signal transition;

wherein said second signal generator has means for producing under stepwise control by said second clock generator a second stepwise succession of three discrete signal values on said second interconnecting wire from a first extreme signal value to a second extreme signal value of said second signal generator and vice versa, two successive discrete signal values being separated by an associated signal transition;

wherein said second detector has means for detecting a transition to either of said first and second extreme signal values of said first signal generator and thereupon enabling said second signal generator to start a second succession from the prevailing one of said first and second extreme signal values of said second signal generator;

and wherein said first detector has means for detecting a transition to either of the first and second extreme signal values of said second signal generator and thereupon enabling said first signal generator to start a first succession from the prevailing one of first and second extreme signal values of said first signal generator.

2. A synchronization system comprising a first station having a first clock generator, a first signal generator and a first detector; a second station having a second clock generator, a second signal generator and a second detector; said first signal generator and said second detector being interconnected by a single first interconnecting wire, said second signal generator and said first detector being interconnected by a single second interconnecting wire, wherein said first signal generator has means for producing under stepwise control by said first clock generator a first stepwise succession of three discrete signal values on said first interconnecting wire from a first extreme signal value to a second extreme signal value and vice versa, two successive discrete signal values being separated by an associated signal transition;

wherein said second signal generator has means for producing under stepwise control by said second clock generator a multivalent signal value on said second interconnecting wire, including at least a first and a second enabling signal value, said synchronization system having state sequencing means for separating two successive enabling signal value productions by at least one intermediate state;

wherein said second detector has means for detecting a transition to either of said first and second extreme signal values of said first signal generator and thereupon enabling said second signal generator to start a transition to a next-following enabling signal value, and wherein said first detector has means for detecting a transition to any enabling signal value of said second signal generator and thereupon enabling said first signal generator to start a said first succession from the prevailing one of said first and second extreme signal values.

3. A synchronization system as claimed in claim 2, wherein said intermediate state is entered into in said first station, while said second signal generator has at least four discrete states for generating in each state an associated enabling signal value.

4. A synchronization system as claimed in claim 2, wherein said intermediate state is entered into in said second station, while generating an intermediate signal value between the first enabling signal value and the second enabling signal value.

5. A synchronization system comprising a first station having a first clock generator, a first signal generator and a first detector; a second station having a second clock generator, a second signal generator and a second detector; said first signal generator and said second detector being interconnected by a single interconnecting wire and said second signal generator and said first detector being interconnected by said single interconnecting wire;

wherein said first signal generator has means for producing under stepwise control by said first clock generator a first stepwise succession of three discrete signal values on said interconnecting wire, from a first extreme signal value to a second extreme signal value, and vice versa, two successive signal values being separated by an associated discrete signal transition;

wherein said second signal generator has means for producing under stepwise control by said second clock generator a second stepwise succession of three discrete signal values on said interconnecting wire, from a first extreme signal value to a second extreme signal value of said second signal generator and vice versa, two successive discrete signal values being separated by an associated signal transition;

wherein said interconnecting wire has summing means for summing any two signal values received to an aggregated signal value having at least five discrete values, two successive aggregated signal values being separated by an associated aggregated signal value transition;

wherein said second detector has means for detecting a transition to either of said first and second extreme signal values of said first signal generator as represented in said aggregated signal value and thereupon activating said second signal generator to start a second stepwise succession from the prevailing one of said first and second extreme signal values of said second signal generator;

and wherein said first detector has means for detecting a transition to either of said first and second extreme signal values of said second signal generator as represented in said aggregated signal value and thereupon enabling said first generator to start a said first stepwise succession from the prevailing one of said first and second extreme values of said first signal generator.

6. A synchronization system as claimed in claim 5, wherein said aggregated signal has a value range of five uniformly spaced signal values.

* * * * *